C. A. BLUHM.
PIPE COUPLING.
APPLICATION FILED NOV. 14, 1913.
1,095,789.
Patented May 5, 1914.
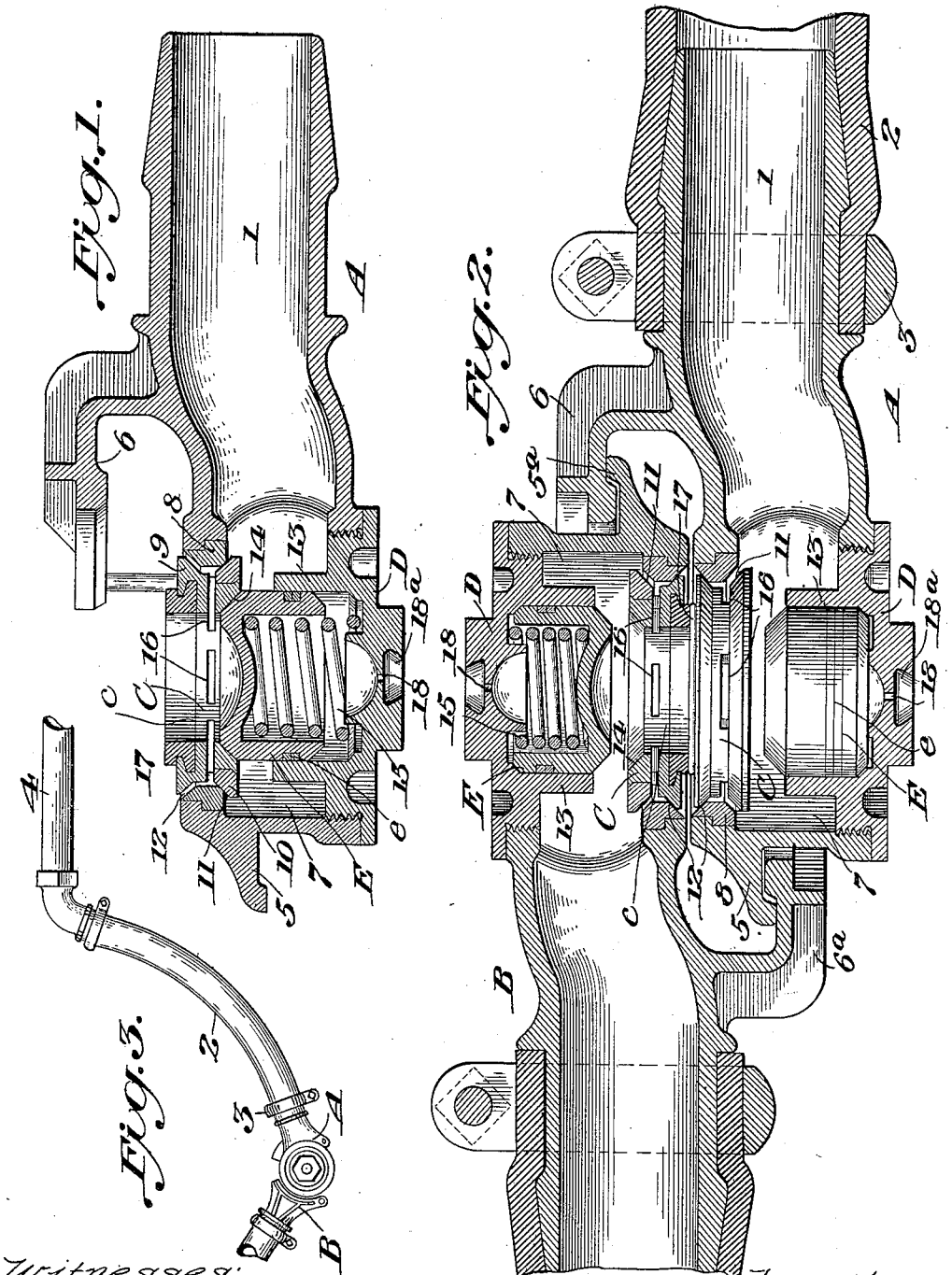

UNITED STATES PATENT OFFICE.

CHARLES A. BLUHM, OF MICHIGAN CITY, INDIANA.

PIPE-COUPLING.

1,095,789.  Specification of Letters Patent.  Patented May 5, 1914.

Application filed November 14, 1913. Serial No. 801,010.

*To all whom it may concern:*

Be it known that I, CHARLES A. BLUHM, a citizen of the United States, residing at Michigan City, in the county of Laporte and State of Indiana, have invented certain new and useful Pipe-Couplings, of which the following is a specification.

My invention relates to an improvement in pipe couplings, and pertains more particularly to couplings of that type used to connect the air hose in the air brake supply line of a train between two cars, and thus establish communication between the air pipe of one car and the air pipe of the car next in line.

The object of this invention is to provide a coupling in which the passage for the air is normally closed and which, when the coupling sections on two adjacent cars are interlocked, by the contact between the two members, causes the valve closing the passage to be moved from its seat, and to permit the flow of air through the coupler members from the one pipe to the other.

A further object is to so arrange the parts that when the connection is broken, either purposely or accidentally, the valve will automatically return to its seat, and will prevent the escape of fluid from the train pipe of either car, and the brake system will maintain its highest efficiency.

A still further object is to so construct the parts that there will be little danger of dirt or ice collecting in the several working parts, and thus preventing the successful automatic operation of the coupler member.

This invention consists of still other novel features of construction and combinations of parts which will be hereinafter described and pointed out in the claims.

In the accompanying drawings: Figure 1 is a longitudinal vertical sectional view through one of the coupler members showing the parts in their normal or closed position; Fig. 2 is a similar sectional view through two members coupled together to show the relation of the parts when in a position that air is permitted to flow from one pipe to the other, and Fig. 3 is a view in elevation showing the two members coupled together.

The casing A is in its exterior features made of standard form, being provided with a tubular extension 1 over which the flexible hose 2 is held by a clip 3, and this hose is connected at its other end with the train air pipe 4. The member A is intended to be coupled and held to a member B by the usual hook 5 and a grooved flange 6, which interlock with similar parts 5ª and 6ª on the member B. As the members A and B are exact duplicates, and in fact, all of the couplers supplied upon the cars of a road would be identical so that they could be interchangeable, as it were, when different cars are brought together, I will therefore describe only the member A and will refer to those parts of the member B which coöperate.

The coupler member is on its body portion cored out at 7. This cored-out portion is open at both sides. On that side adjacent the grooved flange 6, the casing A is made on two diameters, and a double valve seat 8 is fitted to that portion to bear against the shoulder between the two diameters, and is thus prevented from being forced out of the casing. A follower head C is formed of two members, 9 and 10. These members are connected together to fit within the opening of the valve seat member 8, and to embrace this member. A valve face 11 is provided on the member 10, and a valve face 12 on the member 9, and these valve faces bear against the inner and outer valve seats of the member 8. A plug D is held in the remaining end of the cored-out portion 7 of the casing by being screwed thereinto, or in any other suitable manner, and the inner surface is provided with a sleeve 13. A valve E is fitted to work in the sleeve 13, and a suitable packing $e$ is provided to prevent the escape of fluid between the valve and the sleeve. The follower head C is provided with a valve seat 14, in which the valve E is normally held seated by spring 15, which bears between the head of the plug and of the valve E. At a point above the valve seat 14, fluid passages 16, 16 are formed through the wall of the follower head, and from the point where these passages penetrate the outer wall to the valve surface 12, the follower head is made of a diameter say 1/64 of an inch less than the diameter of the valve seat member 8. Also, the valve faces 11 and 12 are spaced a suitable distance apart, that the follower head can move when the parts are in the position shown in Fig. 1, with the valve face 11 in its closed relation, say 1/32 of an inch into the cored-out portion of the casing before the valve face 12 comes into its closed position on the outer side of the valve seat member 8. When the coupler member is disconnected, the parts, through the action of spring 15, will assume the position shown in Fig. 1, as the valve E seats in the valve seat 14 of the member C, and in turn holds this member with the valve face 11, in its working position, thus the coupler member A is closed to the passage of fluid therefrom.

Each of the coupler members is provided on its follower head around the opening $c$ through which the fluid passes from the one member to the other with the usual rubber gasket or packing 17. When the members are connected as shown in Fig. 2, the gaskets 17 bear one against the other, and as the hooks 5 and 5$^a$ are brought into position beneath the members 6 and 6$^a$, the follower heads of the two members are forced into the cored-out portions of the casings A and B. As the follower heads are moved into the casings, the valve faces 11 are moved from their engagement with the valve seat of the member 8, and the air in the car air pipe is permitted to pass up between the follower head and the valve seat member, and escape to the atmosphere between the valve face 12 and its correspondent seat, thus, if dirt or cinders have lodged between this valve face and seat, they will be blown out by the pressure of the fluid, and the follower head valve face 12 will be permitted to seat tightly against the seat provided on the member 8. When this valve face 12 is seated, the fluid is prevented from escaping to the atmosphere, and escapes through the fluid passages 16 of the follower head. As the fluid pressure in the main pipe line is constant, the volume passing through the fluid passages 16 exerts a pressure against the heads of the valves E equal to the pressure of the air in the main train pipe. The springs 15 behind the valves E are made sufficiently weak that they will not resist the pressure which is normally supplied to the train pipe, and thus the valves are forced from their seats 14 into the sleeves 13. As long as the pressure of fluid through the coupler members is constant, and is sufficiently high to overcome the force of the springs 15, these valves will be held open, and each member will be free to the passage of fluid, but immediately the connection between the two members is severed, the pressure against the head of the valve E is decreased, as the fluid is permitted to escape to the atmosphere. This decreased pressure would not be sufficient to overcome the force of the spring 15, and this causes the valve to be closed against the seat 14. As stated, the valve exerting a presure against the valve seat 14 causes the follower head to be brought to a position that the valve face 12 closes upon the seat provided on the member 8, and all communication from the air pipe to the atmosphere through a coupler member is cut off.

It will be found preferable to provide a small opening or escape passage 18 through the head of the plug D back of the valve E, so that there will not be a pressure or vacuum created, as the valve moves to the one or the other of its positions, and around this vent it is preferable that a cavity 18$^a$ be provided to prevent water passing directly into the passage.

From the foregoing it will be seen that I have provided a coupler member which is of very few parts and simple in assembly and operation, and one with which there is little danger of the parts being disarranged, or of dirt and ice collecting to clog the members and prevent the most efficient operation, so it will be seen that while when the members are connected the members are free and open to the passage of fluid, immediately the connection is severed, the passages of the members will be effectually closed, and the escape of fluid absolutely precluded.

I claim:

1. A pipe coupling comprising a coupler member constructed to have interlocking connection with a similar member, a follower head located in the passage of the coupler member, and provided with an opening therethrough, and a valve mounted in the passage beyond and independently of the follower head to close said opening, said parts so arranged that as the connection is formed, the follower head is depressed into the passage, fluid is admitted against the head of the valve to cause the valve to be opened, and as the connection is severed, the parts are permitted to return to their normal and closed position.

2. A pipe coupling comprising a coupler member constructed to have interlocking connection with a duplicate member, a follower head located in the passage of each member and provided with an opening therethrough, and a valve mounted in each passage beyond and independently of the follower head to close said openings, said parts so arranged that as the connection is formed, the follower heads are depressed into the passages to permit the fluid pressure to bear between the valves and against the heads thereof to open the valves, and as the connection is severed, the parts are permitted to return to their normal and closed position to prevent the escape of fluid from each of said parts.

3. A pipe coupling comprising a coupler member constructed to have interlocking connection with a similar member, a follower head located in the passage of the coupler member and provided with an opening therethrough, a valve mounted in the passage beyond and independently of the follower head, and means for holding said valve normally in a closed position to prevent the flow of fluid through said opening, said parts so arranged that as the connection is formed, the follower head is depressed into the passage to admit the fluid pressure against the head of the valve to cause the valve to be opened against the tension of the closing means, and as the connection is severed, the valve is permitted to return to its closed position.

4. A pipe coupling comprising a coupler member constructed to have interlocking connection with a similar member, a follower head located in the passage of the coupler member and provided with an opening therethrough, a valve mounted in the passage beyond and independently of the coupler member and constructed to seat over and close said opening, said follower head provided with fluid passages through the walls thereof above the seat of the valve, and said parts so arranged that as the connection is formed, the follower head is depressed into the passage to permit the flow of fluid through said fluid passages, where it exerts a pressure against the head of the valve, and causes the valve to be opened, and as the connection is severed, the fluid is permitted to escape to the atmosphere, releasing the pressure against the valve, and the valve is permitted to close.

5. A pipe coupling comprising a coupler member constructed to have interlocking connection with a similar member, said coupler member having a passage formed through that side on which the connection is formed, a follower head located within the passage and provided with an opening therethrough, a valve seat formed around the opening of the passage, a valve face on the follower head positioned to engage with the valve seat and form a fluid-tight connection between the two, a valve located within the passage beyond the follower head to normally seat over and close the opening, therethrough, and said parts so arranged that as the connection is formed, the follower head is depressed into the passage, and fluid is admitted against the head of the valve to cause the valve to be opened, and as the connection is severed, the valve is permitted to return to its closed position.

6. A pipe coupling comprising a coupler member, constructed to have interlocking connection with a similar member, and provided with a passage through that side to which the connection is made, a follower head located in the passage to have endwise movement therein and provided with an opening therethrough, a valve seat formed around the opening of the passage, a valve face formed in the follower head to seat upon said valve seat and prevent the escape of fluid between said two members, a valve located in the passage beyond the follower head, to seat over and close said opening, a spring for holding said valve normally in its closed position and through the engagement thereof with the follower head, holding the follower head in a like closed position, and said parts so arranged that as the connection is formed, the follower head is depressed into the passage, and fluid is admitted against the head of the valve to cause the valve to be opened from its position over the opening of the follower head, and as the connection is severed, the parts are permitted to return to their normal position through the tension of the spring.

7. A pipe coupling comprising a coupler member constructed to have interlocking connection with a similar member and provided with a passage through that side on which the connection is made, a follower head located in the passage and provided with an opening therethrough, a valve seat provided around the opening of the passage, a valve face formed on the follower head to seat in said valve seat, said follower head provided with a passage through the wall thereof beyond the valve face, a valve located in the passage beyond the follower head, resilient means to hold said valve in position to normally seat over and close the opening of said follower head and to hold the valve face thereof in engagement with the valve seat of the casing, and all of said parts so arranged that as the connection is formed, the valve face is moved from the valve seat, and fluid is permitted to flow through the fluid passages to exert a pressure against the valve head and cause the valve head to be opened, and as the connection is severed, the parts are caused to return to their closed positions.

8. A pipe coupling comprising a coupler member constructed to have interlocking connection with a duplicate member, a follower-head located in the passage of each member and provided with an opening therethrough, a valve mounted in each passage beyond and independently of the follower-head to close said opening, and flexible packings positioned on the follower-heads around the openings thereof to extend beyond the contour of the coupler member, said packings so positioned that as the connection is formed the packing of the one member comes in contact with the packing of the follower-head of the other member, and the follower-heads are depressed into the passages to permit the fluid pressure to bear between the valves and against the heads thereof to open the valves, and said packings adapted to be compressed to form a tight connection between the two members.

In testimony whereof I affix my signature, in the presence of two witnesses.

CHARLES A. BLUHM.

Witnesses:
 HENRY H. BLUHM,
 JOHN J. BLOCK.

---

Copies of this patent may be obtained for five cents each, by addressing the "Commissioner of Patents, Washington, D. C."